United States Patent Office 2,982,613
Patented May 2, 1961

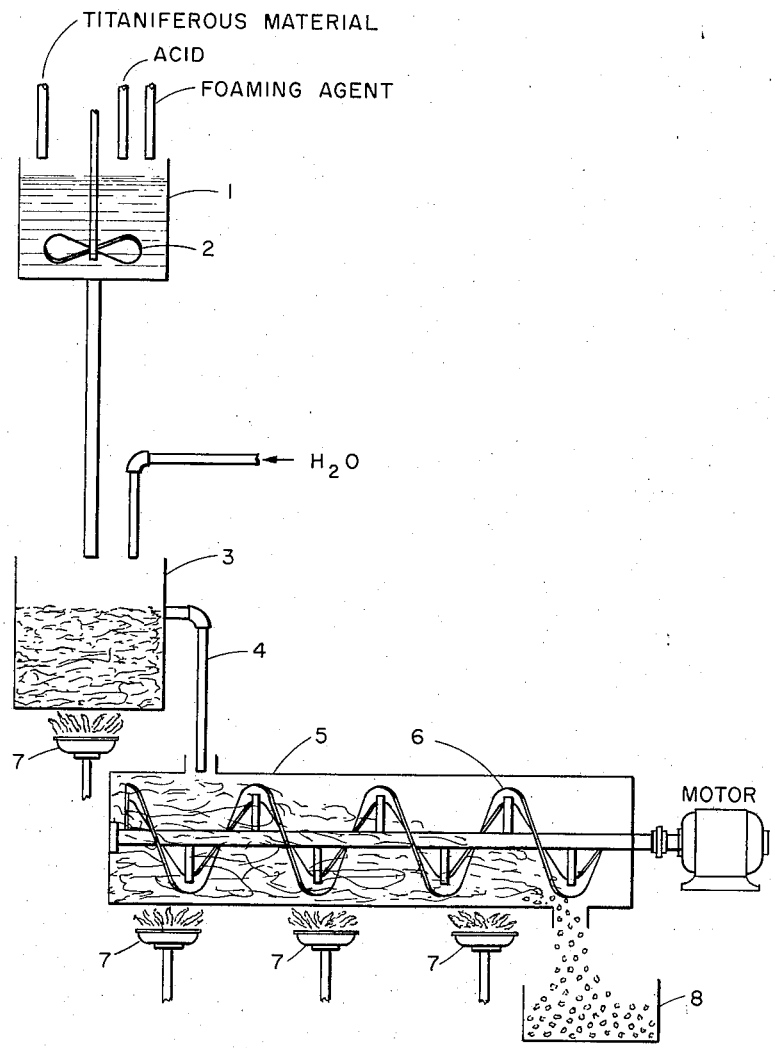

2,982,613

CONTINUOUS TITANIFEROUS IRON MATERIAL DIGESTION PROCESS UTILIZING CONCENTRATED SULFURIC ACID, A FOAMING AGENT AND WATER

Thomas S. Griffin, St. Louis, Mo., assignor to National Lead Company, New York, N.Y., a corporation of New Jersey Filed Feb. 16, 1959, Ser. No. 793,383

7 Claims. (Cl. 23—117)

This invention relates in general to a method for solubilizing a titaniferous iron material. More specifically, it relates to an improved method for digesting or solubilizing a titaniferous iron material in concentrated sulfuric acid.

Many methods have been proposed for solubilizing titaniferous iron ores. Among these include reacting the ore with hydrochloric or sulfuric acid in various concentrations under a variety of conditions to solubilize the iron and titanium values. From a commercial standpoint the most successful of these methods is a batch digestion procedure in which the titaniferous iron ore is reacted with concentrated sufuric acid in a large digestion tank. Steam and water are then added to the mixture to raise the temperature of the mixture to its reaction temperature. As soon as the reaction temperature is reached, an extremely violent reaction occurs and the entire mixture forms a so-called "digestion cake" in the matter of a few minutes. This "cake" is then retained in the digestion tank for a number of hours in order to cure or "dry" the "cake." After curing, the dried "cake" is then dissolved in water or weak acid to obtain an iron sulfate and titanium sulfate solution. Such a process is more fully described and claimed in U.S. Patent No. 1,889,027.

Although this process has been used commercially for the past 30 years, it suffers from a number of disadvantages. It is a batch process which requires the use of large size equipment which unfortunately has a relatively low rate of through-put. The batch process is restricted to certain operational steps using particular acid concentrations and reaction temperatures and it is not readily adaptable to changes and variations in operational conditions. In addition, large losses of heat and $SO_3$ occur as stack losses due to the extreme violence of the batch digestion reaction. Furthermore, a solid massive "digestion cake" is formed in the bottom of the digestion tank which is not only difficult but slow to dissolve in an aqueous medium.

It is, therefore, an object of the instant invention to provide a continuous process for digesting a titaniferous ore, concentrate or slag in concentrated sulfuric acid which has a much greater through-put than the conventional batch digestion process. A further object is to provide a digestion process which is amenable to more variations in operating details than those which can be tolerated in the batch digestion process. A still further object is to provide a digestion process which reduces the stack losses of heat and $SO_3$. Another object is to provide a process which produces a finely divided and more readily soluble digestion mass which is free flowing and can be transported without sticking to the walls of the vessel in which it is made. These and other objects will become more apparent from the following more detailed description of the instant invention.

In its broadest aspects this invention contemplates a continuous method for digesting a titaniferous material selected from the group consisting of a titaniferous ore, concentrate or slag to render the iron and titanium values soluble in aqueous media which comprises forming a mixture of said titaniferous material and concentrated sulfuric acid and adding thereto water and a foaming agent at a temperature to initiate the digestion of said titainiferous material, said digestion taking place in the presence of a heavy foam formed by said foaming agent, and continually adding more of said titaniferous material and said acid mixture with additional water and said foaming agent to the previously formed foam to produce continuously more digestion product in the foam, collecting and heating said foam containing said digestion product to form a free flowing dried digestion mass in the form of discrete small beads, curing and subsequently dissolving said beads in an aqueous medium.

In carrying out the digestion process of the instant invention, it is desirable to employ finely ground titaniferous material in order to obtain high recoveries of the titanium values. Ground ore, concentrates and slags having a size range smaller than 200 mesh has been found to be particularly satisfactory. The digestion recoveries decrease somewhat if coarser material is employed.

The amount of sulfuric acid employed is dependent upon the anaylsis of the titaniferous material used. It is desirable to add sufficient sulfuric acid to produce both titanium sulfate and iron sulfates from the titanium and iron values in the titaniferous material. Usually the theoretical quantities of sulfuric acid are employed to produce: (1) iron sulfate, both ferrous and ferric sulfates from the iron values in the ore and (2) titanium sulfate which lies somewhere between the normal titanium sulfate, $Ti(SO_4)_2$ and titanyl sulfate, $TiOSO_4$. It has been found to be particularly satisfactory to employ sulfuric acid (in addition to that required to form iron sulfates) in amount to obtain a weight ratio of $H_2SO_4/TiO_2$ of 1.7 to 2.4.

The concentration of the sulfuric acid may vary considerably but it has been found desirable to employ concentrations from 82% to 95% at reaction in order to obtain a rapid digestion. It is preferred, however, to employ acid concentrations of 86% to 91% at the time of reaction for ores while 88% to 94% is preferred for slags. It is also desirable to employ higher initial acid concentrations which may be cut with water or steam before reaction. This heat of dilution is useful in initiating the digestion reaction. It has been found desirable to employ initial acid concentrations which are at least 2% higher than the concentration used at reaction.

In order to initiate the reaction the mixture of the titaniferous material and the acid are heated either directly or indirectly, particularly by the addition of steam. A more convenient way is to employ sulfuric acid of higher concentrations, say 91% to 96% and to add water in a quantity to reduce the concentration at the time of reaction to 86% to 91%. The heat of dilution will in most instances be sufficient to produce the necessary temperature required for the reaction of the titaniferous material and acid mixture.

In the instant invention, the titaniferous material and the concentrated sulfuric acid are admixed in a mix tank which is equipped with an agitator. To this mixture is added a foaming agent followed by the addition of the set-off water, plus heat, if required. Substantially immediately the digestion reaction forms a voluminous foamy mass containing the digestion product. This foamy mass is thereafter collected in a reactor where the digestion product is allowed to react further. As the reaction is completed, the foam subsides and the digestion product obtained from the reacted titaniferous material takes the form of dry small beads or balls of digested material, the majority of which have a size less than ¼ of an inch in diameter. These beads of "digestion cake" are discrete, small, spherical shaped particles which are free flowing and readily transportable since they are dry and not sticky.

It has been found that the type of foaming agent used is critical. The foaming agent must be one which is able to withstand the high temperatures and acid concentration employed and still produce sufficient foam to keep all of the titaniferous material and the acid in a suspended state during the reaction. A particular type of foaming agent which has been found to be useful is the N-alkyl triethylene diamine where the alkyl group is derived from a fatty acid having from 12 to 18 carbon atoms. Among the most useful of these derivatives of the fatty acids are those derived from oleic, lauric, coconut, soya and tallow. The amount of the foaming agent used should lie between about 0.05% and 0.35% of the weight of the titaniferous material.

Many types of apparatus may be used for carrying out the digestion process of the instant invention. One such type of apparatus is to provide a small tank or container in which the digestion reaction takes place initially, the voluminous digestion product-containing foam being allowed to overflow the small tank and to be collected in a larger tank. The foam could also overflow the small tank onto a conveyor system. In any event, it is necessary to collect the digestion product-containing foam and to hold this foam at a temperature of at least 150° C. to dry out the beads of "digestion cake."

A particularly desirable type of apparatus for carrying out the digestion operation of the instant invention which has been developed is the apparatus shown in the drawing.

An apparatus which has been used successfully for carrying out the process of the instant invention is shown schematically in the drawing. In carrying out the process, ground titaniferous material and concentrated sulfuric acid are added in measured quantities to mix tank 1 equipped with agitator 2. A foaming agent is then added to the titaniferous material and the slurry containing the foaming agent from mix tank 1 is then added to tank 3 along with sufficient set-off water and heat to initiate the reaction between the titaniferous material and the acid.

The initiated reaction mass is then passed through overflow pipe 4 and collected in a horizontal reactor 5 which is equipped with a rotating scroll 6 which extends throughout the length of reactor 5.

External heat may be applied if desired to tank 3 or reactor 5 by burners.

As the titaniferous material and the acid slurry is admixed with the set-off water in tank 3, the reacting mass continues to discharge into the reactor 5 in the form of foam, the titaniferous material and the acid violently reacting to form small beads of "digestion cake" which are suspended in the foam. The rotating scroll carries the digestion product-containing foam from the charging end of the reactor to its exit end where the foam has subsided and the reaction between the titaniferous material and the acid is completed. Upon completion of the reaction the dry free-flowing and non-sticky small beads are discharged from the reactor into a suitable collector 8.

The small beads of digested material are either cured before discharging from the reactor or cured in a separate operation. These cured small beads of digested material are readily transported and dissolved in an aqueous medium.

In order to more fully illustrate the process of the instant invention, the following examples are presented.

EXAMPLE 1

Ilmenite ore ground to minus 200 mesh had the following analysis:

|  | Percent |
|---|---|
| $TiO_2$ | 50.0 |
| $FeO$ | 30.2 |
| $Fe_2O_3$ | 10.0 |
| Others | 9.8 |
|  | 100.0 |

Using the apparatus shown in the drawing, 6500 grams of ore were mixed with 5711 ml. of 93% $H_2SO_4$ to form an ore-acid slurry. 16.3 grams of N-oleic trimethylene diamine were added to the slurry. The slurry was then pumped to another tank where it was admixed with water to set off the reaction between the ore and acid. The hot slurry was added to a rate equivalent to 83 grams of ore per minute along with 8.5 ml. of water per minute.

A violent foamy reaction occurred substantially immediately and the foaming reacting material flowed voluminously into the horizontal reactor. The scroll flights were rotated at 1.5 minutes per revolution and small beads of "digestion cake" formed in the foamy mass as it was moved by the rotating scroll flights toward the discharge end. The temperature of the foamy mass entering the reactor was 100–140° C. which rose to a peak temperature of 170–195° C. The digestion beads leaving the reaction had a temperature of 130° C. The beads were then cured at 155° C.–160° C. for 6 hours in a separate vessel.

The cured material was solubilized in water at 55° C. in 4 hours. 92.2% of the titanium values in the ore were solubilized by using this digestion procedure. This type of digestion material dissolved more readily than the regular commercial batch digestion cake. The bulk density of these beads was only 66 lbs./cu. ft. while a regular digestion cake has a bulk density of at least 85 lbs./cu. ft.

EXAMPLES 2–4

In these examples the procedure of Example 1 was repeated except that variations were made in the times, temperatures, acid concentrations and foaming agents employed. The operational data and the results obtained in these runs are recorded in the following table along with those of Example 1.

From the above description and by the examples presented, it has clearly been shown that a titaniferous material can be digested in concentrated sulfuric acid using the continuous method of the instant invention in which the reaction is carried out in a suspended state in the foam created by the foaming agent employed. By digesting the titaniferous material in this manner the digestion mass obtained is in the form of small beads which are dry, non-sticky and readily transportable. These small beads of digested material are very readily solubilized in aqueous media thereby shortening considerably the overall time that is required for the prior art commercial batch digestion process. In addition the stack losses which normally are high in the batch process are substantially completely eliminated. No condensing systems are required to recover these losses.

The instant process is simple and economical to employ, it is amenable to variations in operating details and it does not require any complicated or expensive equipment to maintain.

While this invention has been described and illustrated by the examples shown, it is not intended to be strictly limited thereto and other modifications may be employed within the scope of the following claims.

digestion reaction products in the form of discrete small beads; curing said beads; and subsequently dissolving said beads in an aqueous media.

Table

|  | Ex. 1 | Ex. 2 | Ex. 3 | Ex. 4 |
|---|---|---|---|---|
| Type of Titaniferous Material | Ilmenite Ore. | Ilmenite Ore. | Ilmenite Ore. | Ilmenite Ore. |
| Amount Used (gms.) | 6,500 | 6,000 | 7,500 | 8,500 |
| Initial $H_2SO_4$ Concentration (Percent) | 93 | 95.5 | 93 | 93 |
| Amount Used (ml.) | 5,711 | 5,140 | 6,600 | 7,480 |
| Concentration of Acid at Reaction (Percent) | 88 | 88 | 88 | 88 |
| Type of Foaming Agent (N-alkyl trimethylene diamine) | N-oleic | N-tallow | N-soya | N-coconut |
| Amount of Foaming Agent (gms.) | 16.3 | 15.0 | 11.3 | 21.2 |
| Amount of Water Added (gms.) | 600 | 910 | 675 | 770 |
| Rate of Titaniferous Material—Acid Slurry Added (gms. ore/min.) | 83 | 70 | 70 | 120 |
| Rate of Water Added (ml./min.) | 8.5 | 8 | 6 | 10 |
| Temperature of Slurry Before $H_2O$ Cut (° C.) | 40 | 60–65 | 60–75 | 80 |
| Peak Digestion Temp. (° C.) | 170–195 | 205 | 180–190 | 175–185 |
| Bead Discharge Temp. (° C.) | 130 | 90–108 | 120–180 | 90–105 |
| Retention Time in Reactor (min.) | 18–20 | 30–36 | 13–15 | 25–30 |
| Curing Time (Hrs.) | 6 | 6 | 6 | 6 |
| Curing Temp. (° C.) | 155–160 | 145–175 | 150–170 | 155–175 |
| Dissolving Liquor | $H_2O$ | $H_2O$ | $H_2O$ | $H_2O$ |
| Time of Dissolving (Hrs.) | 4 | 4 | 3 | 4 |
| Temp. of Dissolving (° C.) | 45–90 | 45–55 | 45–55 | 45–55 |
| Amount of Titaniferous Material Solubilized (Percent) | 92.2 | 90.5 | 92.0 | 94.0 |

I claim:

1. A continuous method for digesting a titaniferous iron material selected from the group consisting of a titaniferous ore, ore concentrate and slag to render the iron and titanium values soluble in aqueous media which comprises: forming a mixture of said titaniferous iron material, concentrated sulfuric acid, a foaming agent and water, said water being added to initiate the reaction between the titaniferous iron material and the concentrated acid, said foaming agent employed being an N-alkyl triethylene diamine wherein the alkyl group is derived from a fatty acid having from 12 to 18 carbon atoms, said foaming agent being present in an amount in the mixture sufficient to form a heavy foam which holds in suspension substantially all of the reactants and the digestion reaction products in said foam, said foaming agent being stable during the digestion reaction in order to suspend the reactants and the reaction products; continually adding more of said titaniferous material, said acid, said foaming agent and said water to the previously formed foam to produce additional heavy foam and reaction products suspended in said foam; continually collecting and heating said foam containing the reaction products suspended in said foam to form dried 2. Process according to claim 1 in which the alkyl group in said N-alkyl triethylene diamine is derived from oleic acid.

3. Process according to claim 1 in which the alkyl group in said N-alkyl triethylene diamine is derived from lauric acid.

4. Process according to claim 1 in which the alkyl group in said N-alkyl triethylene diamine is derived from coconut oil.

5. Process according to claim 1 in which the alkyl group in said N-alkyl triethylene diamine is derived from soya oil.

6. Process according to claim 1 in which the alkyl group in said N-alkyl triethylene diamine is derived from tallow.

7. Process according to claim 1 in which the amount of said N-alkyl triethylene diamine employed is from 0.05% to 0.35% of the weight of the titaniferous iron material.

References Cited in the file of this patent

UNITED STATES PATENTS 2,767,053     Griffin et al.               Oct. 16, 1956